(12) United States Patent
Komazaki

(10) Patent No.: US 6,804,176 B1
(45) Date of Patent: Oct. 12, 2004

(54) APPARATUS AND METHOD FOR PERFORMING TRACK SEARCH

(75) Inventor: Takahiro Komazaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/512,370

(22) Filed: Feb. 25, 2000

(30) Foreign Application Priority Data

Feb. 26, 1999 (JP) ......................................... P11-051864

(51) Int. Cl.$^7$ ............................................. G11B 17/22
(52) U.S. Cl. ................................ 369/30.03; 369/30.13; 369/30.15
(58) Field of Search ............................. 369/30.3, 30.1, 369/47.38, 47.4, 30.13, 30.15

(56) References Cited

U.S. PATENT DOCUMENTS

| | | | | |
|---|---|---|---|---|
| 4,899,325 A | * | 2/1990 | Katsuhara et al. | 369/30.16 |
| 4,955,009 A | * | 9/1990 | Nakatsu et al. | 369/30.13 |
| 4,955,010 A | * | 9/1990 | Nabeshima et al. | 369/30.18 |
| 5,042,019 A | * | 8/1991 | Kitai et al. | 369/30.13 |
| 5,228,019 A | * | 7/1993 | Yanagi | 369/44.28 |
| 5,241,522 A | * | 8/1993 | Yanagi | 369/30.13 |
| 5,548,569 A | * | 8/1996 | Shimizume et al. | 369/44.28 |
| 5,856,735 A | * | 1/1999 | Sakashita | 318/696 |
| 6,249,495 B1 | * | 6/2001 | Okada et al. | 369/44.28 |
| 6,288,983 B1 | * | 9/2001 | Jeong | 369/30.36 |
| 6,341,103 B1 | * | 1/2002 | Takeda et al. | 369/30.15 |
| 6,407,877 B1 | * | 6/2002 | Mitani | 360/78.11 |

* cited by examiner

Primary Examiner—Aristotelis M Psitos
(74) Attorney, Agent, or Firm—Jay H. Maioli (57) ABSTRACT

Apparatus for providing fine search in a sled movement mechanism employing a stepping motor by controlling the speed with which the head jumps in succession to next neighboring tracts on a disc and by causing pickup movement accurately for a distance corresponding to the distance of movement of the objective lens to realize the fine search in the sled movement mechanism employing the stepping motor. Also, the distance of head movement in the radial direction of the disc can be prescribed and, upon interruption of the head jumping operation, the head can be subsequently transported a distance corresponding to the target number of track jumps.

9 Claims, 8 Drawing Sheets

APPARATUS AND METHOD FOR PERFORMING TRACK SEARCH

BACKGROUND OF THE INVENTION

1. Field of the Invention

This invention relates generally to an information recording/reproducing method and apparatus and to a transmission medium for use therein and, more particularly, relates to an information recording/reproducing method and apparatus and to a transmission medium that is able to search a desired track reliably despite employing a simplified structure.

2. Description of the Background

Figure 7:
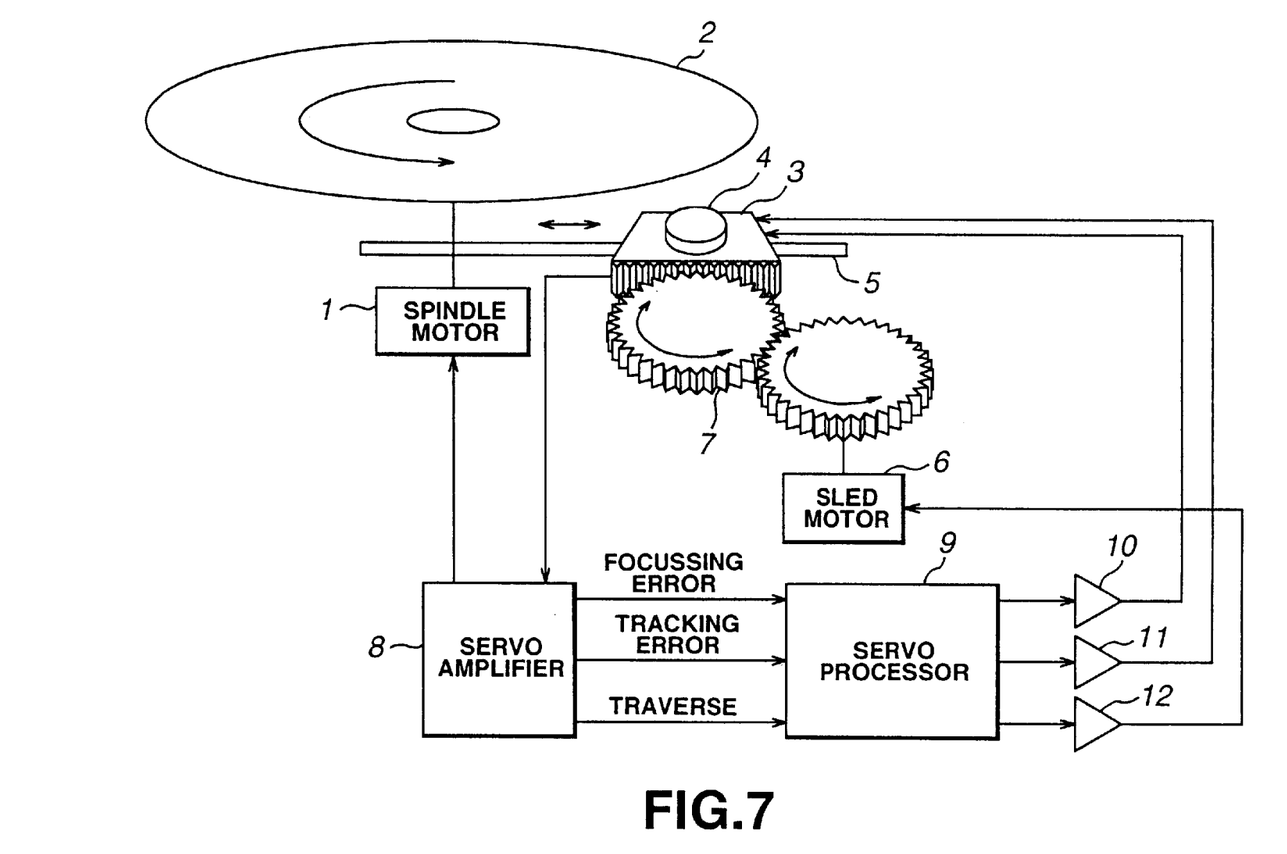
FIG. 7 shows an illustrative structure of a conventional optical disc device.

FIG. 7 shows the principal elements of a conventional optical disc device, in which an optical disc 2 is rotated at a pre-set speed by a spindle motor 1. A pickup 3 associated with the head mechanism illuminates laser light radiated from an enclosed laser diode via an objective lens 4 to the optical disc 2 for recording/reproducing the information. A sled motor 6, is configured for transporting the pickup 3 via a gear 7 along a sled guide rod 5 in the radial direction of the optical disc 2.

A servo amplifier 8 generates focussing error signals, tracking error signals, and traverse signals from an output signal of the pickup 3 to output the thus generated signals to a servo processor 9. The traverse signal is a signal generated by comparing the tracking error signal with a zero level as a reference level.

The servo processor 9 processes the focussing error signals in a pre-set fashion to route the processed focussing error signals via a focussing drive amplifier 10 to the pickup 3 to drive the objective lens 4 in the correct focussing direction. The servo processor 9 also processes the tracking error signals in a pre-set fashion to send the processed signals to the pickup 3 via a tracking drive amplifier 11 to drive the objective lens 4 by a tracking actuator to make small adjustments in the tracking direction. The servo processor 9 also is responsive to the output signals from the servo amplifier 8 to generate a sled drive signal from the voltage signals of the low range component and sends this sled drive signal via a sled drive amplifier 12 to the sled motor 6 to transfer the pickup 3 via a gear 7 along a sled guide rod 5 in the radial direction of the optical disc 2. The servo amplifier 8 also controls the spindle motor 1 to control the rotation of the optical disc 2.

Figure 8:
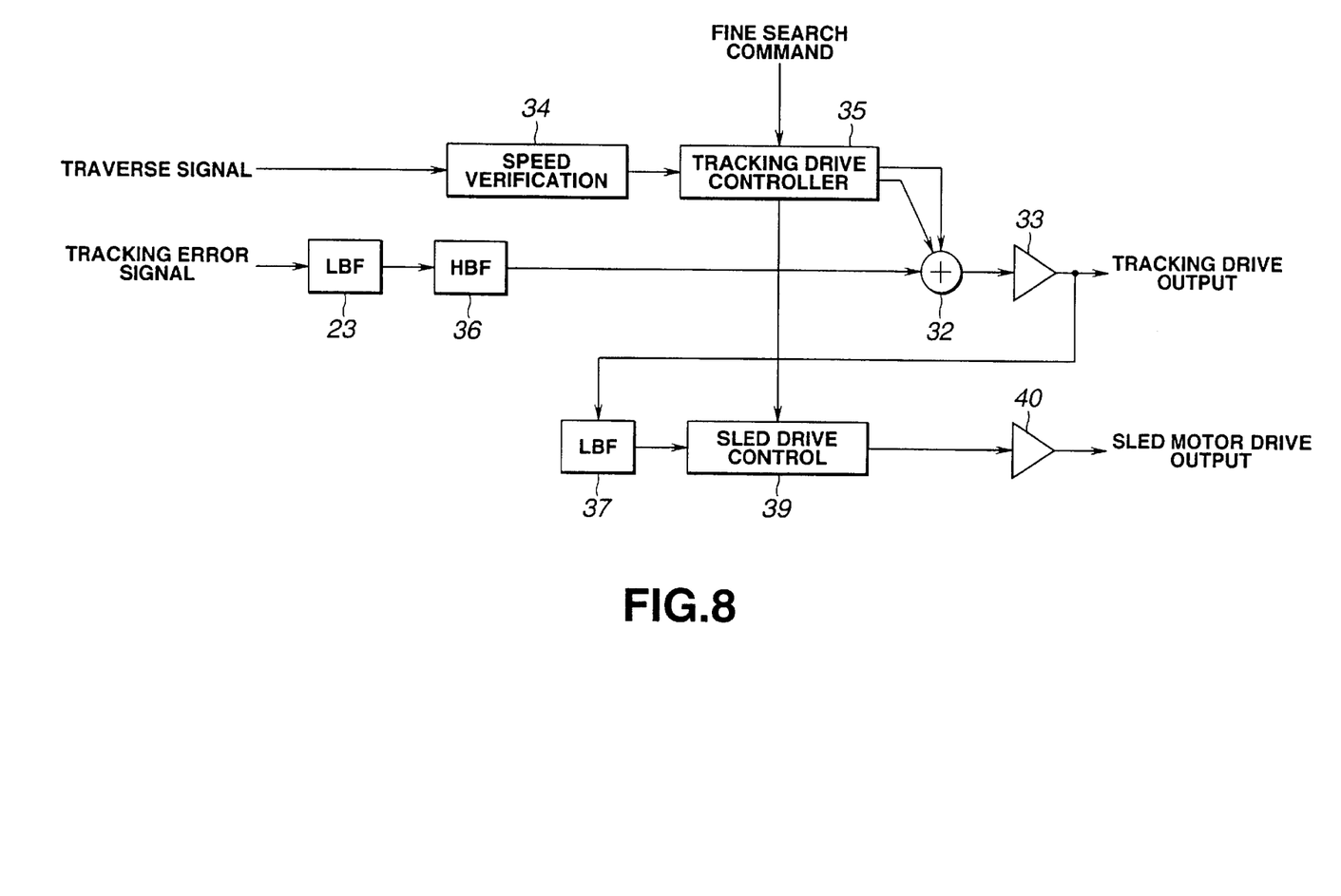
FIG. 8 shows an illustrative structure of the conventional optical disc device in more detail.

FIG. 8 represents a circuit structure mainly for the tracking servo and the sled servo. The tracking error signals are fed to a first low boost filter (LBF) 23 and outputted via a high-range, phase-lead, high boost filter (HBF) 36, an adder 32, and an amplifier 33. A speed verifying unit 34 detects a rising edge and a falling edge of an input traverse signal and verifies the transfer speed of the pickup 3 using the edge interval and outputs a result of the decision to a tracking drive controller 35. During ordinary reproduction, neither the speed verifying unit 34 nor the tracking drive controller 35 is used. During fine search, however, the tracking drive controller 35 is responsive to a signal from the speed verifying unit 34 to generate pulses for driving the pickup 3 in the direction toward the outer rim of the disc or to generate pulses for driving the pickup 3 in the direction toward the inner rim of the disc and outputs the so-generated pulses to the adder 32.

The tracking drive output is again fed as a sled error signal to a second low boost filter 37 and subsequently fed to a sled drive controller 39. This signal is amplified by an amplifier 40 to drive the sled motor as a sled motor drive output signal, which drives the pickup 3 in the direction toward the outer rim or toward the inner rim of the disc along the sled guide rod 5.

Referring to the timing chart of FIGS. 9A–9E, the operation for performing a fine search will be explained. Fine search means the operation of jumping the pickup 3 track-by-track in the direction toward the outer rim or toward the inner rim of the disc to transfer the pickup 3 a pre-set number of tracks, such as from 10 to 1000 tracks, in order to search for the desired track. In the fine search, the pickup moves first and then the sled follows.

Figures 9A, 9B, 9C:
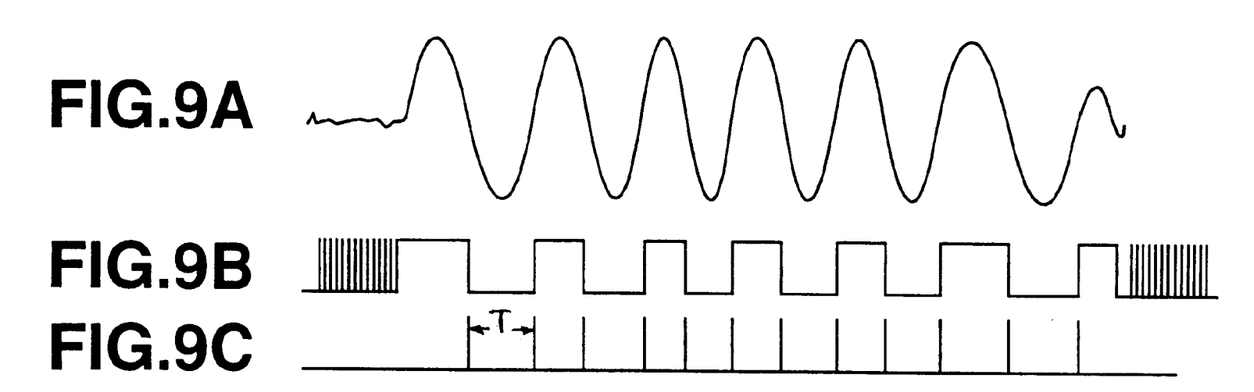
FIGS. 9A–9E are timing waveforms for illustrating the operation at the time of fine search of the illustrative structure shown in FIG. 7.
Figure 9D:
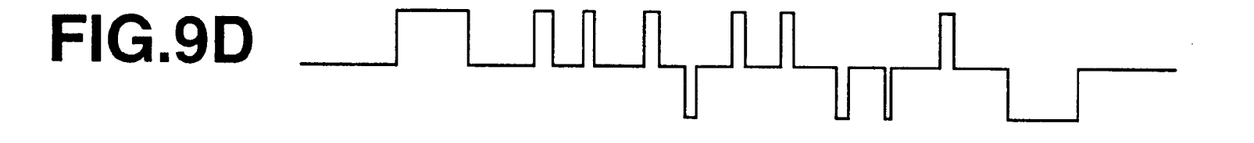

As an example of operation, if a controller in the form of a micro-computer, not shown, issues a command for doing a fine search toward outer rim side tracks for a pre-set number of tracks, the tracking drive controller 35 outputs a tracking drive kick pulse, shown in FIG. 9D, to effect a jump of the objective lens 4 by one track in the direction toward the outer rim of the disc. It is assumed that a signal of positive polarity is a signal for transferring the objective lens 4 in the direction toward the outer rim of the optical disc 2, and that a signal of negative polarity is a signal for transferring the objective lens 4 in the direction toward the inner rim of the optical disc 2. Therefore, in this example, a kick pulse of positive polarity is output from the tracking drive controller 35 and is routed via the adder 32 and the amplifier 33 to the tracking drive amplifier 11 and thence to the pickup 3. This causes the objective lens 4 of the pickup 3 to jump by one track in the direction toward the outer rim of the optical disc 2. Similar operations are carried out in succession until a jump of the pre-set number of tracks is achieved.

In such case, the tracking error signal output by the servo amplifier 8 is varied sinusoidally each time the pickup performs a track jump, as shown in FIG. 9A. The traverse signal, generated by comparing the tracking error signal to the zero level reference, is a rectangular signal having a rising edge or a falling edge at the zero-crossing point of the tracking error signals. The speed verifying unit 34 detects the rising and falling edges of the traverse signal and generates edge detection signals, as shown in FIG. 9C. The speed verifying unit 34 also measures an interval T of the edge detection signals to check whether this interval T is larger than a pre-set reference value, that is, to check the period or speed, of the fine search. If the interval T is larger than a reference value, that is, if the fine search speed is slower than the reference speed, the speed verifying unit 34 outputs a signal of, for example, positive polarity and if the interval T is smaller than the reference value, that is, if the fine search speed is faster than the reference speed, the speed verifying unit 34 outputs a signal of negative polarity.

The tracking drive controller 35 generates tracking drive kick pulses, based on results of the decision from the speed verifying unit 34, in meeting with the fine search direction. Since the fine search direction in this case is toward the outer rim of the disc, the tracking drive controller 35 generates a tracking drive kick pulse of positive polarity if the signal from the speed verifying unit 34 is of positive polarity. On the other hand, if the signal from the speed verifying unit 34 is of negative polarity, it generates a tracking drive kick pulse of negative polarity.

Thus, if the fine search speed is slower than the reference speed, the objective lens 4 is kicked or jumped by the tracking pulse in the direction toward the outer rim of the optical disc 2, that is, in the fine search direction. Conversely, if the fine search speed is faster than the reference speed, the objective lens 4 is fed with a tracking drive kick pulse to move it in the direction toward the inner rim of the optical disc 2. It should be noted that, because the objective lens 4 is continuously jumping in the direction toward the outer rim of the optical disc 2 as the disc is being played back, by this tracking drive kick pulse in the direction toward the inner rim of the disc the objective lens 4 is braked against driving in such direction, with the result that servo is applied so that the fine search speed will be a pre-set reference speed, without actually being jumped in the direction toward the inner rim.

Figure 9E:
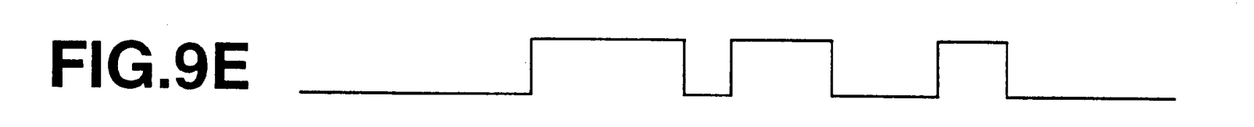

Meanwhile, with the pickup 3 being halted on the sled guide rod 5, if the objective lens 4 is shifted gradually in its position from the center towards the outer rim of the optical disc 2, the pickup 3 needs to be moved in the same direction as the objective lens 4, because the objective lens 4 cannot be moved beyond its movable range. That is, the pickup 3 must catch up to the objective lens 4. Thus, the tracking drive controller 35 outputs a control signal to the sled drive controller 39 only during a time when accelerating pulses are generated for movement in the radial direction on the disc. At this time, the sled drive controller 39 generates sled drive kick pulses, as shown in FIG. 9E, that are fed to the sled motor 6 via amplifier 40 and sled drive amplifier 12. This causes rotation of the sled motor 14 to transport the pickup 3 via gear 7 in the direction toward the outer rim of the optical disc 2. It suffices if, at this time, the gain of the amplifier 40 is adjusted so that the objective lens 4 will not be offset significantly from the center within the pickup 3.

The fine search comes to a close when the above-described operations are repeatedly performed to effect the track jump operation over the pre-set number of tracks.

In a conventional optical disc device, the sled motor 6 is typically designed as a DC motor. Thus, the conventional optical disc device is increased in size and difficult to design with a small size, because of the provision of the sled motor 6 as a DC motor along with the gear 7.

Recently, attempts have been made to use a stepping motor to reduce the size of the optical disc device. If the stepping motor is used, the gear 7 is redundant.

A characteristic of a stepping motor is that the amount of rotation of the motor is determined solely by the number of pulses inputted to the motor. Thus, it becomes impossible to adjust the gain, as in the case of the DC motor, to prevent the objective lens from becoming offset from the center within the pickup.

Also, if the fine search operation is interrupted, due to flaws on the disc, for example, it has not been possible with the conventional mechanism employing the conventional DC motor to transport the head a distance corresponding to the initial target movement number of tracks.

OBJECTS AND SUMMARY OF THE INVENTION

Thus, it is an object of the present invention to realize a fine search operation in a sled movement mechanism employing a stepping motor.

It is another object of the present invention to enable the head to be transported to a position close to the target track, by exploiting characteristics of the stepping motor in realizing correct transporting distance, even if the search is interrupted.

For resolving the above problem, the present invention in one aspect records or reproduces the information for a disc, in which, with the use of a head supported by a supporting member for movement along the radius of the disc, the head is moved a prescribed distance in the direction along the radius of the disc, the distance over which the head is moved along the radius of the disc is detected and head movement by a head driver is controlled in accordance with the detected distance.

In another aspect, the fine search is enabled by a sled motor mechanism employing a stepping motor. Also, a pickup can be transported to the vicinity of a target, even on interruption of the fine search. The apparatus includes a speed detection unit that detects a fine search speed from an interval between a decaying edge and a rising edge of a traverse signal generated based on zero-crossings of tracking error signals and a tracking drive controller that generates tracking drive kick pulses of such a polarity as to give a constant fine search speed. When a traverse counter has counted the edges in an amount corresponding to the distance of one step of micro-step driving of the stepping motor, it controls a sled drive controller to transport the pickup by one step in a direction along the radius of the disc, which is a so-called fine search direction.

DETAILED DESCRIPTION OF PREFERRED EMBODIMENTS

Figure 1:
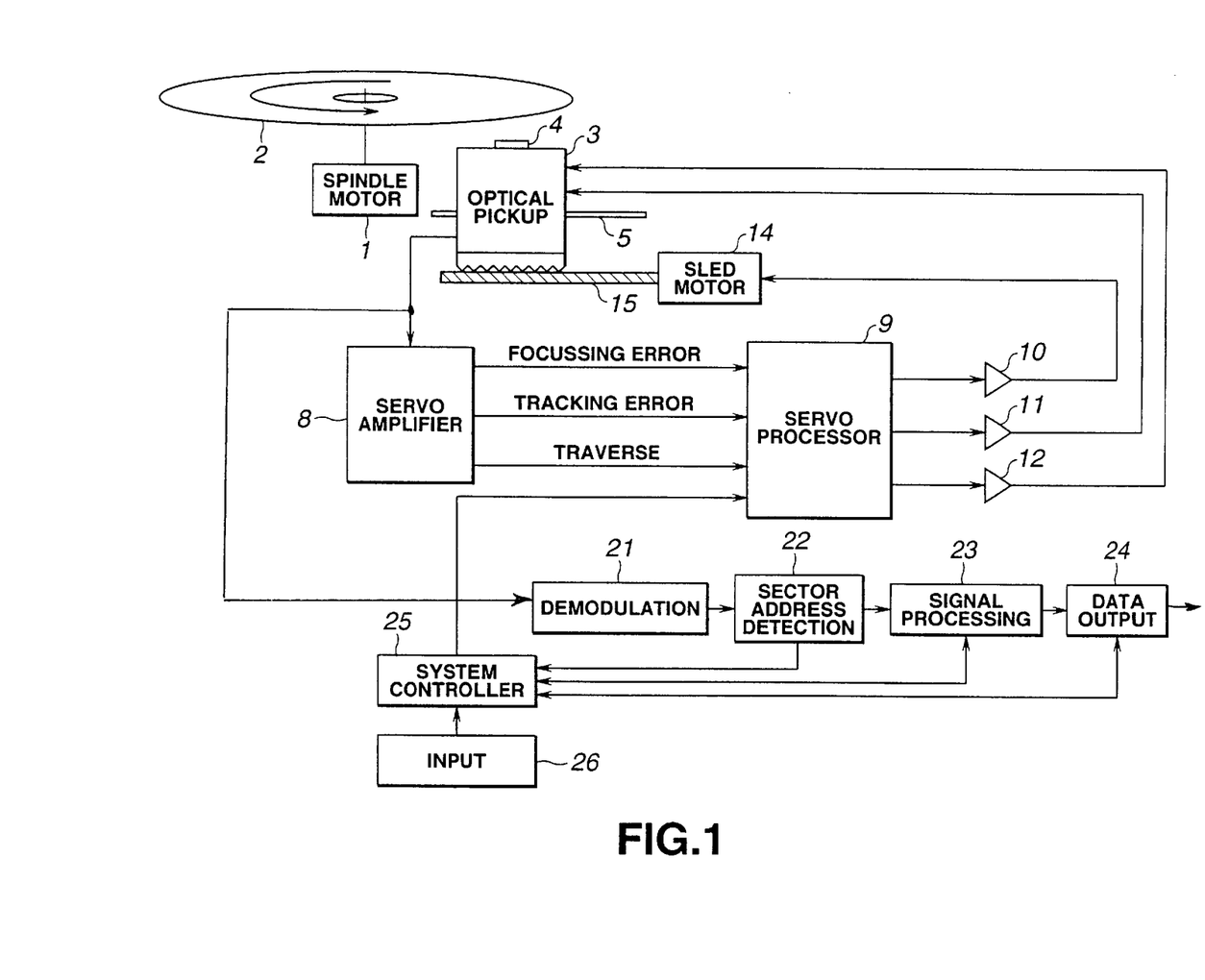
FIG. 1 shows an illustrative structure of an optical disc device embodying the present invention.

FIG. 1 shows the structure of an optical disc device embodying the present invention in which parts or components corresponding to those shown in FIG. 7 are denoted by the same reference numerals.

The optical disc device includes a spindle motor 1 for rotationally driving the optical disc at a pre-set speed and a pickup 3 for illuminating the laser light radiated by the enclosed laser diode via an objective lens 4 on the optical disc 1 for recording or reproducing information. The optical disc device also includes a sled guide rod 5 for supporting the pickup 3 for movement along the radius of the optical disc 2, a screw guide 15 for moving the pickup 3 along the sled guide rod 5, and a sled motor 14.

The optical disc device further includes a servo amplifier 8 for generating focussing error signals, tracking error signals, and traverse signals from the RF signals produced by the pickup 3, and a servo processor 9 for generating focussing drive signals, tracking drive signals, and sled drive signals from the focussing error signals, the tracking error signals, and the traverse signals from the servo amplifier 8. The optical disc device of FIG. 1 includes a focussing drive amplifier 10, a tracking drive amplifier 11, and a sled drive amplifier 12 for respectively amplifying the focussing error signals, the tracking error signals, and the sled drive signals from the servo processor 9 for driving the focussing actuator, the tracking actuator, and the sled motor 14, respectively The optical disc device further includes a demodulation circuit 21 for demodulating RF signals fed thereto from the pickup 3. Also included is a sector address detection circuit 22 for detecting sector addresses from the signal of the demodulation circuit 21, a signal processing circuit 23 for processing the signals from the signal processing circuit 23, a data outputting circuit 24 for processing and outputting data from the signal processing circuit 23, a system controller 25 for controlling various parts of the optical disc device, and an input unit 26.

The basic structure of the servo system of the present embodiment is similar to that shown in FIG. 7, however, in the present embodiment a stepping motor is used as a sled motor 14 corresponding to the sled motor 6 shown in FIG. 7. The driving gear 7 is eliminated, and the sled motor 14 directly rotates the screw guide 15 as a supporting member to feed the head. In the present embodiment, the term head is used to donate the combination of the pickup 3 and the objective lens 4 provided on the pickup 3. The optical disc 2 is illuminated by the laser light from the head to record/reproduce the information.

The output RF signals obtained by the pickup 3 upon reproducing the optical disc 2 are fed to a demodulation circuit 21 and are binary coded so as to be corrected for errors and routed in the error-corrected state to a sector address detection circuit 22. The sector address detection circuit 22 extracts from the supplied digital data the address of a sector in which the digital data is recorded, that is, the address of the sector from which data is currently being read out from the pickup 3, and outputs the extracted address to the system controller 25. The digital data supplied from the demodulation circuit 21 is also fed to the signal processing circuit 23 through the sector address detection circuit 23.

The signal processing circuit 23 processes the supplied digital data in a pre-set fashion, for example, it expands the compressed data, and then feeds the processed data to the data outputting circuit 24 from which it is output.

If multiplexed data is recorded on the optical disc 2, the signal processing circuit 23 selects one of the multiplexed data, depending on a pre-set setting, and outputs the sector address, which is the address of the selected data, to the system controller 25.

The data outputting circuit 24 is configured to output data supplied from the signal processing circuit 23 to another circuit, not shown, and is under control of the system controller 25.

The system controller 25 is configured for controlling the servo amplifier 8 in response to the sector address from the sector address detection circuit 22 and to a user command supplied from the inputting unit 26.

When reproduction is commanded from the inputting unit 26, the system controller 25 controls the servo amplifier 8 to run the optical disc 2 in rotation at a pre-set speed, as well as to generate the focussing error signals and the tracking error signals from an output signal of the pickup 3 to output the generated focussing and tracking error signals to the servo processor 9. The servo processor 9 sends the focussing and tracking error signals via the focussing drive amplifier 10 and the tracking drive amplifier 11, respectively, to the pickup 3. This executes the focussing servo of driving the objective lens 4 in the focussing direction and the tracking servo of driving a tracking actuator for moving the objective lens 4 as a so-called inching means in the tracking direction.

Output signals corresponding to the playback signals of the optical disc 2 produced by the pickup 3 are routed to the demodulation circuit 21 and binary coded so as to be then fed to the sector address detection circuit 22 for sector address detection. The system controller 25 detects the readout position of the optical disc 2 from the sector detected by the sector address detection circuit 22 and controls the servo processor 9, so that the laser light radiated from the pickup 3 via the objective lens 4 will be converged on the readout position. Responsive to this control, the servo processor 9 controls the sled motor 14 to transport the pickup 3 to a pre-set position on the optical disc 2. The servo processor 9 can also generate tracking driving pulses and outputs the generated tracking driving pulses to the pickup 3. This places the pickup 3 in register with the pre-set sector address from which readout is started.

The playback data from the optical disc 2 is demodulated by the demodulation circuit 21 and routed via the sector address detection circuit 22 to the signal processing circuit 23. The signal processing circuit 23 processes the input signal by expansion, for example, and outputs the resulting data to the data outputting circuit 24, which then outputs signals inputted from the signal processing circuit 23 to a further output circuit, not shown.

Figure 2:
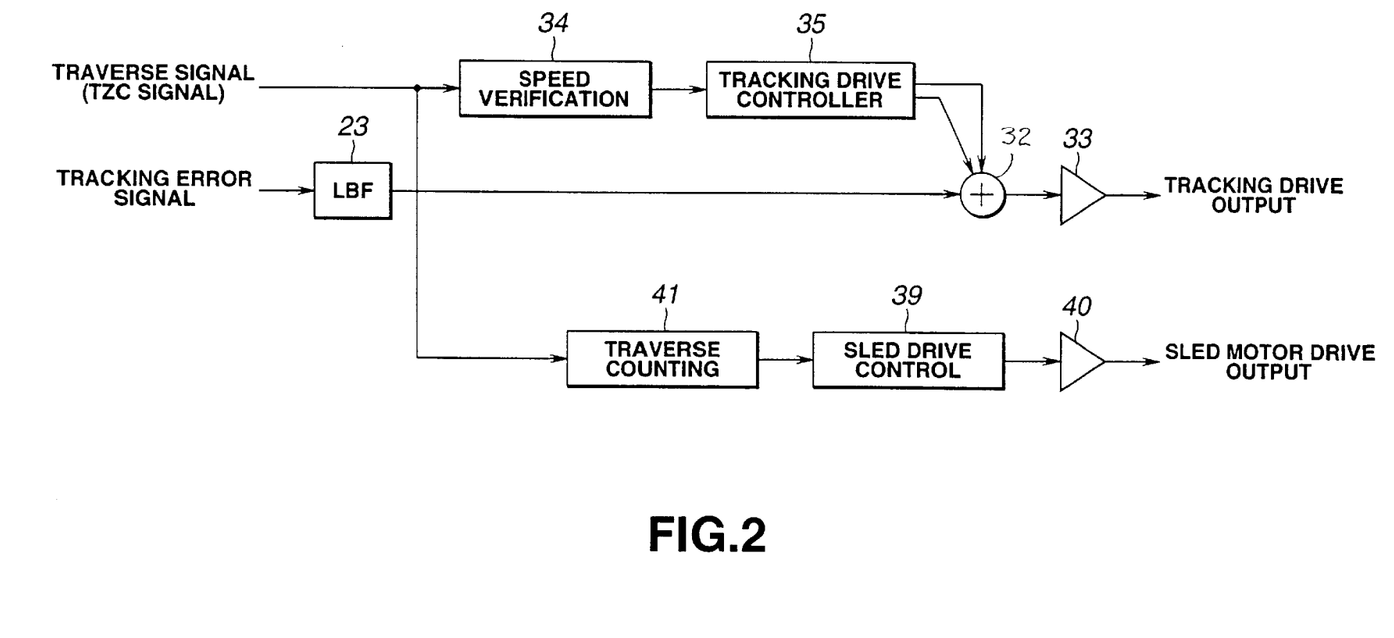
FIG. 2 is a block diagram showing an illustrative structure of a servo processor 9 used in the device shown in FIG. 1.

The tracking servo portion and the sled servo portion of the servo processor 9 are constructed as shown in FIG. 2, in which portions corresponding to those shown in FIG. 8 are depicted by the same reference numerals.

The tracking servo portion and the sled servo portion of the servo processor 9 include a speed verification or detection unit 34 for detecting the head speed from the traverse signal, a tracking drive controller 35 for controlling the tracking drive based on the speed detected by the speed detection unit 34, and a low-boost filter (LBF) 23 fed with the tracking error signals. The tracking servo portion and the sled servo portion also include an adder 32 for adding signals from the low-boost filter 23 and the tracking drive controller 35, and an amplifier 33 for amplifying signals from the adder 32 to provide a tracking drive output.

The tracking servo portion and the sled servo portion of the servo processor 9 also include a traverse counter 41 for counting traverse signals, a sled drive controller 39 for controlling the sled drive based on the results of counting by the traverse counter 51, and an amplifier 40 for amplifying signals from the sled drive controller 39.

The traverse counter 41 is configured for counting the traverse pulses to control the sled drive controller 39 based on the counted results.

When the head is moved by the tracking actuator along the radius of the optical disc 2, the system controller 25, shown in FIG. 1, receives from the servo processor 9 the results of counting of the pulses of the traverse signals corresponding to the head traversing the recording tracks formed on the disc 2. Responsive to the counted results of the traverse pulses, the system controller 25 detects the distance of movement of the pickup 3 as driven by the sled motor 14.

Figure 3:
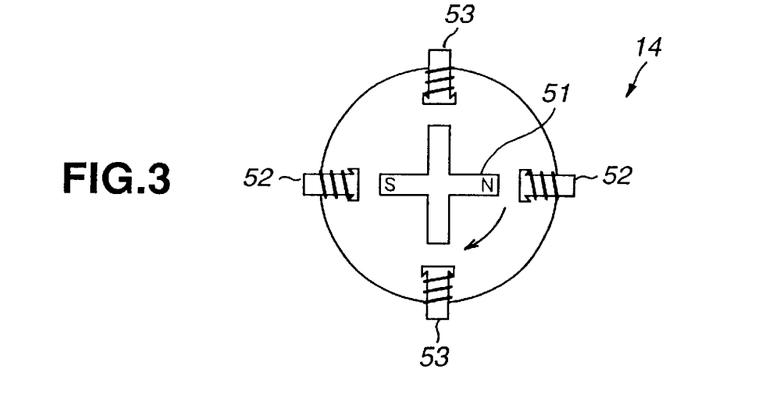
FIG. 3 shows the structure of an internal cross-section of a stepping motor 6 used in the device shown in FIG. 1.

The operation of the stepping motor driving the sled mechanism should be explained with reference to FIG. 3, before proceeding with a description of the system operation during the fine search. In the stepping motor used as the sled motor 14, two coils, namely an A-phase electromagnet 52 and a B-phase electromagnet 53, are arranged on the outer rim of the motor. The respective positions are offset 90° along the direction of rotation, as shown in FIG. 3. On the motor shaft, not shown, a permanent magnet 51 is mounted at right angles to the centerline of the motor shaft.

Figure 4A:
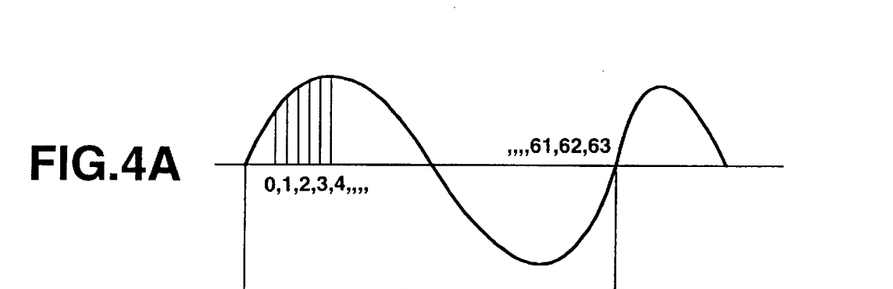
FIGS. 4A–4B show waveforms of micro-step driving of the stepping motor 6 of FIG. 1.
Figure 4B:
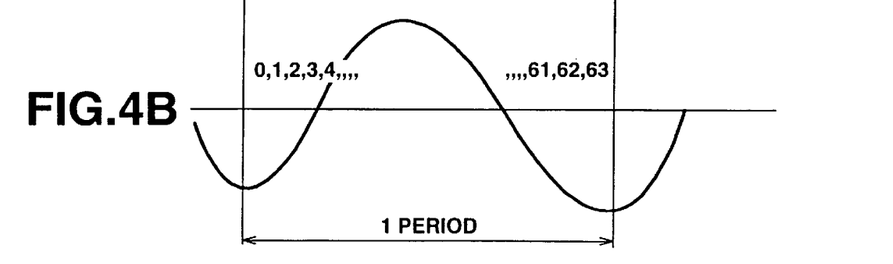

The stepping motor is run in rotation by flowing the current of a sine wave form shown in FIG. 4 in the A-phase coil 52 and the B-phase coil 53. That is, the voltage shown in FIG. 4A and the voltage shown in FIG. 4B are applied to the A and B phases, respectively. When the sine waveform is generated on a micro-computer, for example, a period of the sine wave is associated with 64 steps, that is, one period is split into 64 sections, and voltage values associated with the angles of the respective steps are applied to the coils, so that the stepping motor can be rotated in micro-sized steps at an optimum accuracy. This rotating method is termed micro-step driving.

In the present embodiment, a system is considered in which a sled mechanism is moved 6.25 $\mu$m in the micro-step movement for each one-step partial rotation. Since the track pitch is 0.74 $\mu$m in the case of a DVD player, there are approximately 6.25/0.74=8.5 tracks for each one-step distance. On the other hand, in the case of a CD, there are 6.25/1.6=3.9 tracks.

Figure 6A:
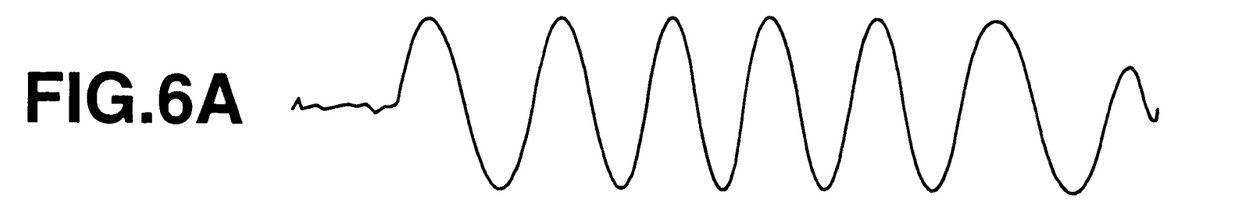
FIGS. 6A–6E are timing waveforms for illustrating the operation at the time of fine search in the device of FIG. 1.
Figure 6B:
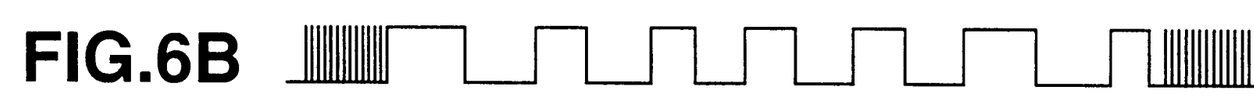

If the fine search operation is carried out using this mechanism, the tracking error signals output by the servo amplifier 8 are varied sinusoidally for each track jump, as shown in FIG. 6A. The traverse signal, generated by comparing the tracking error signals to the zero reference level, becomes a rectangular wave signal having a rising edge or a falling edge at a zero-crossing point of the tracking error signals, as shown in FIG. 6B. This rectangular wave signal represents the traverse signal indicating how many tracks have been traversed.

Figures 6C, 6D:
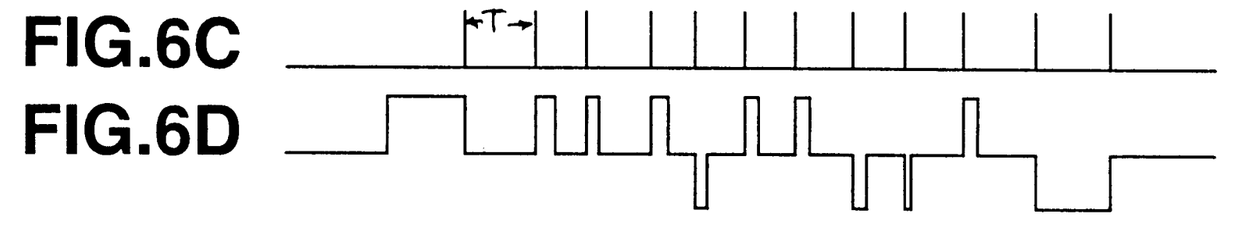
Figure 6E:
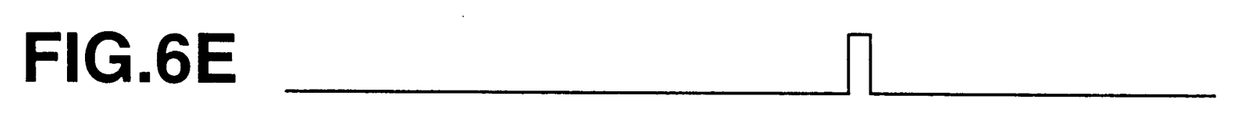

If the fine search to a track that is a pre-set number of tracks toward the outer disc rim is commanded by, for example, a micro-computer, the tracking drive controller 35 outputs a tracking drive kick pulse shown in FIG. 6D. In this example it is assumed that a positive polarity signal transfers the objective lens 4 toward the outer rim of the disc, while a negative polarity signal transfers the objective lens 4 toward the inner rim of the disc. Thus, in the present case, the kick pulse of positive polarity is output from the tracking drive controller 35. This kick pulse is sent from the adder 32 and the amplifier 33 to the tracking drive amplifier 11 and thence to the optical pickup 3. This causes the objective lens 4 of the pickup 3 to effect a one-track jump toward the outer disc rim. A similar sequence of operations is performed until the track jump over the pre-set number of tracks has been completed.

When the objective lens 4 is moved along the radius of the optical disc 2, during the fine search the above-mentioned traverse signals are produced as the tracks are traversed. When the traverse signal is inputted to the speed detection unit 34, the rising and falling edges of the traverse signal are detected to generate an edge detection signal shown in FIG. 6C. The speed detection unit 34 also measures the interval T of the edge detection signal to check whether or not the interval T is larger than a pre-set reference value. That is, the speed detection unit 34 verifies the fine search speed from the period or interval T.

If the interval T is larger than the reference value, that is, if the fine search speed is slower than the reference speed, the speed detection unit 34 outputs a signal of, for example, a positive polarity. If the interval T is smaller than the reference value, that is, if the fine search speed is faster than the reference speed, the speed detection unit 34 outputs a signal of a negative polarity. Thus, the optical disc further includes the speed detection unit 34 for detecting the speed of movement of the head along the radius of the optical disc and performs controls so that, if the speed is larger than the reference speed, the head speed is lowered.

Meanwhile, with the pickup 3 being halted on the sled guide rod 5, when the objective lens 4 is shifted gradually in its position within the pickup 3 from the center towards the outer rim of the disc, the pickup 3 needs to be moved in the same direction as the objective lens 4, because the lens 4 cannot be moved beyond its movable range and the pickup 3 needs to catch up.

The distance through which the objective lens 4 has been moved can be calculated from the product of the edges of the traverse signals of the optical disc, such as the DVD or CD, counted by the traverse counter 41, and the track pitch of the disc in question. Specifically, the distance through which the objective lens has been moved can be calculated by, for example, the formula of:

$$\text{track pitch} \times \text{number of edges}/2.$$

Therefore, if a number of traverse edges corresponding to a step of the stepping motor is detected, the stepping motor is rotated by one step. Thus, the pickup 3 and the objective lens 4 are moved together in the same direction, with the position of the objective lens 4 in the pickup 3 being substantially unchanged.

Figure 5:
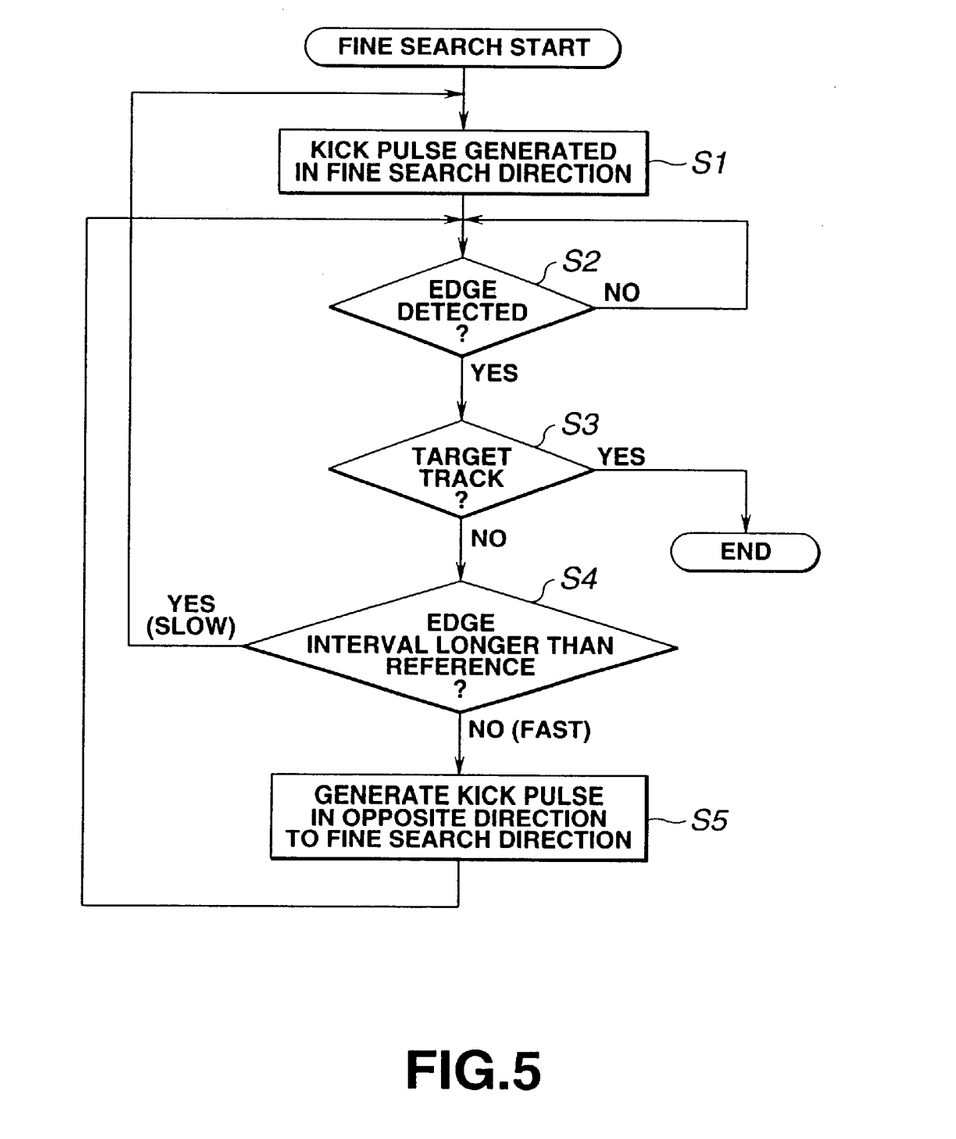
FIG. 5 is a flowchart for illustrating the fine search processing in the illustrative structure shown in FIG. 1.

Referring to the flowchart of FIG. 5 and to the timing chart of FIGS. 6A–6E, the operation of the optical disc device during the fine search is explained.

When the fine search is commanded from the system controller 25, the tracking drive controller 35 at step S1 generates tracking drive kick pulses of the polarity of the appropriate fine search direction. For example, if the fine search in the direction toward the outer rim of the disc is commanded, tracking drive kick pulses of positive polarity are produced, as shown in FIG. 6D. These kick pulses are sent to the tracking coil of the pickup 3 via the adder 32 and the tracking drive amplifier 11. The result is that the objective lens 4 jumps one track toward the outer rim of the optical disc 2.

When the above-described jump operations are repeated sequentially, the tracking error signals are changed sinusoidally each time the objective lens jumps a track, as shown in FIG. 6A. The servo amplifier 8 compares the tracking error signals to the zero reference level to generate a traverse signal, as shown in FIG. 6B. This traverse signal is a rectangular wave signal having rising and falling edges at the zero-crossing points of the tracking error signals.

The speed detection unit 34 at step S2 detects the rising edge and the falling edge of the traverse signal to generate an edge detection signal, as shown in FIG. 6C. After, the speed detection unit 34 detects an edge at step S2, the system controller 25 at step S3 checks whether the pickup has reached a target track, that is, whether it has jumped over the pre-set number of tracks. If the target track has not been reached, the system controller 25 moves to step S4. At step S4, the speed detection unit 34 compares the interval T of the edge detection signal to a pre-set reference value and outputs the result of comparison to the tracking drive controller 35. When a signal indicating that the interval T is longer than the reference value, that is, that the fine search speed is slower than the reference speed, is input from the speed detection unit 34 the tracking drive controller 35 returns to step S1 and generates tracking drive kick pulses in the fine search direction. In this example, it is assumed that the direction toward the disc outer rim is set as the fine search direction. Conversely, when the signal from the speed detection unit 34 indicates that the interval T is shorter than the reference value, that is, that the fine search speed is slower than the reference speed, the tracking drive controller 35 at step S5 generates braking pulses.

The above operation is repeated until it is decided at step S3 that the target track has been reached, that is, that the track jump over the pre-set number of tracks has been performed.

By the above-described fine search operation, edge detection of the traverse signal is as shown in FIG. 6C, and the number of edges is counted by the traverse counter 41, shown in FIG. 2. When the number of traverse edges corresponding to one step of the stepping motor is detected, the stepping motor is rotated one step. In the case of a CD, for example, the track pitch is 1.6 $\mu$m. Thus, if one step of the micro-step driving of the stepping motor is 6.25 $\mu$m, 6.25/1.6×2=7.8, so that, when eight edges of the traverse signals are counted, a control signal is sent to the sled drive controller 39. The sled drive controller 39 is responsive to this control signal to advance the micro-step driving by one step. This causes rotation of the screw guide 15 of the sled to transport the main body of the pickup 3 by 6.26 $\mu$m in the direction toward the outer rim of the disc 2.

Thus, in the present embodiment, the characteristics of the stepping motor are utilized to effect accurate pickup movement over a distance corresponding to the amount of movement of the objective lens 5 to realize fine search in the sled movement mechanism employing the stepping motor.

That is, the optical disc device employs a head supported by the screw guide 15 for displacement at least in the direction along the disc radius, and the sled motor 14 causes movement of the head a pre-set distance along the radius of the disc 2. The optical disc device detects, under control by the system controller 25, the distance by which the head is moved along the disc radius and causes head movement by the tracking actuator based on the detected distance. The head movement distance is determined based on the prescribed number of rotational steps of the stepping motor 14.

According to another embodiment, a method is provided for transporting the pickup accurately to the vicinity of the target track even upon an interruption of the above-mentioned fine search due to, for example, oscillations applied from outside or damage to the optical disc 2.

By knowing the number of tracks up to the target track in the fine search operation, the tracking drive controller 35 continues the search operation until the remaining number of tracks to the target track is zero. Thus, if the search is interrupted due to, for example, disc flaws, in the course of search operations, the number of tracks that need to be jumped up to the target track is known at all times. Based on a remaining number of tracks at the time of search interruption, the distance to be traversed by the pickup can be computed as:

number of target tracks×disc track pitch.

For example, when the search operation is interrupted after jumping 50 tracks, with the target number of tracks being 150, the target can be approximately reached by causing pickup movement a distance corresponding to the remaining 100 tracks. The distance traversed can be calculated to be 100×0.74 $\mu$m=74 $\mu$m. Since each step of the stepping motor is 6.25 $\mu$m, it is suffices if the motor is rotated by 74 $\mu$m/6.25=12 steps.

When the head movement by the tracking actuator is interrupted in the course of the travel of the head to the target track number, the head is moved by the sled motor 14 a distance corresponding to the distance up to the target track under control of the system controller 25.

A transmission medium is also provided by the present invention which, using a head supported at least in a radial direction of the optical disc 2 by the lead screw 15, transmits an information recording/reproducing processing program by the head to the optical disc 2. The recording/reproducing processing program has driving processing for causing head movement over a prescribed distance along the radius of the optical disc 2 and control processing for detecting the distance the head has moved along the radius of the optical disc 2 to control the head movement.

This transmission medium also has tracking processing for causing head movement corresponding to the prescribed number of recording tracks formed on the optical disc 2 to cause head movement along the radius of the optical disc 2.

The transmission medium for transporting the program performing the above processing to a user may be embodied by a recording medium, such as a magnetic disc, a so-called CD-ROM, or a solid memory, and a communication medium, such as a network or a satellite.

Although the information is reproduced in the above-described embodiment, the present invention may also be applied to optical information recording as well.

It is understood, of course, that the above description is presented by way of example only, and that many modifications and adaptations are possibly, so that the present invention is intended to be limited only by the appended claims.

What is claimed:

1. An apparatus for performing a track search operation when reproducing information from a disc, the apparatus comprising:

a head device movably supported for movement at least along a radial direction of the disc;

a pickup movably supported on the head device for reproducing information from the disc;

a stepping motor for moving the head device in the radial direction of the disc toward a target track to be searched;

traverse pulse generating means coupled to the pickup for detecting a crossing of a track by the head device and for generating a plurality of traverse pulses;

speed detecting means for detecting an interval between the traverse pulses generated by the traverse pulse generating means; and control means for generating a drive kick pulse to be supplied to the stepping motor, the control means including traverse signal generating means for generating a traverse signal indicative of a movement of the pickup along the radial direction of the disc and traverse counting means for counting edges of the traverse signal, wherein a speed of the head device is kept constant during the track search;

the stepping motor is rotated one step when a number of edges of the traverse signal corresponding to one step of the stepping motor is detected; and the stepping motor is rotated by micro-step driving.

2. The apparatus according to claim 1, wherein the control means includes drive signal generating means for generating a driving signal for the stepping motor according to a count value of the counter.

3. The apparatus according to claim 1, wherein the control means controls a rotation angle of the stepping motor according to a remaining distance to the target track when the search operation is interrupted.

4. A method for performing a track search operation when reproducing information from a disc using a head supported for movement at least along a radial direction of the disc, comprising the steps of:

driving the head at a constant speed using a stepping motor over a predetermined distance along the radial direction of the disc;

detecting the distance over which the head has been moved along the radial direction of the disc to control the head movement in the driving step in meeting with the distance;

movably supporting a pickup on the head;

detecting a crossing of a track on the disc by the head using a traverse pulse generating means coupled to the pickup that outputs traverse pulses;

detecting an interval between the traverse pulses generated by the traverse pulse generating means using a speed detecting means;

generating a traverse signal;

counting edges of the traverse signal; and generating tracking drive kick pulses based upon the detected interval, wherein the stepping motor is rotated one step when a number of edges of the traverse signal corresponding to one step of the stepping motor is detected; and the stepping motor is rotated by micro-step driving.

5. The method according to claim 4, further comprising the step of generating a driving signal for the stepping motor according to a count value obtained in the counting substep.

6. The method according to claim 4, further comprising the step of controlling a rotation angle of the stepping motor according to a remaining distance to the target track when a track search operation is interrupted.

7. An apparatus for performing a track search operation when recording information from a disc, the apparatus comprising:

supporting means for movably supporting a head device for movement at least along a radial direction of the disc;

moving means for moving the head device along the radial direction of the disc at a constant speed toward a target track to be searched;

traverse pulse generating means coupled to the pickup for detecting a crossing of a track by the head device and for generating a plurality of traverse pulses;

speed detecting means for detecting an interval between the traverse pulses generated by the traverse pulse generating means; and controlling means for controlling a rotation angle of the moving means according to a number of tracks on the disc traversed by the pickup for moving the head device toward the target track, the controlling means including traverse signal generating means for generating a traverse signal and traverse counting means for counting edges of the traverse signal; wherein the head device includes a pickup movably supported on the head device for reproducing information from the disc the moving means includes a stepping motor that is rotated by micro-step driving; and the stepping motor is rotated one step when a number of edges of the traverse signal corresponding to one step of the stepping motor is detected.

8. The apparatus according to claim 7, wherein the controlling means includes driving signal generating means for generating a driving signal for the moving means according to a count value of the traverse counting means.

9. The apparatus according to claim 7, wherein the control means controls a rotation angle of the moving means according to a remaining distance to the target track when a track search operation is interrupted.

* * * * *